United States Patent
Koo et al.

(10) Patent No.: US 7,184,447 B1
(45) Date of Patent: Feb. 27, 2007

(54) APPARATUS AND METHOD FOR DESIGNATING A REVERSE COMMON CHANNEL FOR DEDICATED COMMUNICATION IN A MOBILE COMMUNICATION SYSTEM

(75) Inventors: Chang-Hoi Koo, Songnam-shi (KR); Hyun-Seok Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 600 days.

(21) Appl. No.: 09/613,160

(22) Filed: Jul. 10, 2000

(30) Foreign Application Priority Data

Jul. 10, 1999 (KR) ............................... 1999-27911
Aug. 17, 1999 (KR) ............................... 1999-34013
Sep. 30, 1999 (KR) ............................... 1999-42136

(51) Int. Cl.
*H04B 7/216* (2006.01)

(52) U.S. Cl. .................. 370/441; 370/342; 370/335

(58) Field of Classification Search ................ 370/342, 370/441, 320, 335, 332, 318, 329, 341, 431, 370/2, 468

See application file for complete search history.

(56) References Cited

U.S. PATENT DOCUMENTS

| 5,521,926 | A | | 5/1996 | Ayerst et al. |
| 5,553,074 | A | * | 9/1996 | Acampora .................. 370/349 |
| 5,974,034 | A | * | 10/1999 | Chin et al. .................. 370/328 |
| 6,078,568 | A | * | 6/2000 | Wright et al. ............... 370/312 |
| 6,078,572 | A | * | 6/2000 | Tanno et al. ................ 370/335 |
| 6,091,717 | A | * | 7/2000 | Honkasalo et al. ......... 370/329 |
| 6,144,653 | A | * | 11/2000 | Persson et al. ............. 370/337 |
| 6,198,936 | B1 | * | 3/2001 | Yang et al. ................. 455/515 |
| 6,226,282 | B1 | * | 5/2001 | Chung ........................ 370/335 |
| 6,236,646 | B1 | * | 5/2001 | Beming ...................... 370/335 |
| 6,275,478 | B1 | * | 8/2001 | Tiedemann, Jr. ........... 370/318 |
| 6,320,851 | B1 | * | 11/2001 | Kim et al. .................. 370/320 |
| 6,330,462 | B1 | * | 12/2001 | Chen .......................... 455/572 |
| 6,335,923 | B2 | * | 1/2002 | Kubo et al. ................. 370/335 |

(Continued)

FOREIGN PATENT DOCUMENTS

EP          0 415 898 A1       8/1990

(Continued)

OTHER PUBLICATIONS

Russian Office Action dated May 14, 2002 issued in counterpart Appln. No. PCT/KR00/00744.
Canadian Office Action dated Dec. 23, 2003 issued in a counterpart application, namely, Appln. No. 2,342,637.

*Primary Examiner*—Wellington Chin
*Assistant Examiner*—Steven A Blount
(74) *Attorney, Agent, or Firm*—The Farrell Law Firm

(57) ABSTRACT

A method of designating a channel to be dedicated between a base station and a mobile station in a CDMA communication system. The base station generates designation information including a common channel designation indicator, the address of a common power control channel, transmission rate, and action time and transmits a message with the designation information to the mobile station. Then, the mobile station receives the message with the designation information and transmits a response message for the received message to the base station on a designated channel indicated by the designated channel indicator with transmission power set by the common power control channel at the data rate at the action time.

20 Claims, 15 Drawing Sheets

U.S. PATENT DOCUMENTS

| | | | |
|---|---|---|---|
| 6,434,367 B1 * | 8/2002 | Kumar et al. | 455/70 |
| 6,519,233 B1 * | 2/2003 | Gutierrez | 370/320 |
| 6,519,278 B1 * | 2/2003 | Hiramatsu | 375/140 |
| 6,539,030 B1 * | 3/2003 | Bender et al. | 370/469 |
| 6,614,771 B1 * | 9/2003 | Kim et al. | 370/335 |
| 6,614,810 B1 * | 9/2003 | Lee et al. | 370/341 |
| 6,643,813 B1 * | 11/2003 | Johansson et al. | 714/748 |
| 6,671,286 B1 * | 12/2003 | Rinne et al. | 370/469 |
| 6,788,937 B1 * | 9/2004 | Willenegger et al. | 455/434 |

FOREIGN PATENT DOCUMENTS

| | | |
|---|---|---|
| EP | 0 566 550 A2 | 7/1993 |
| EP | 0 765 096 | 11/1998 |
| JP | 09-055693 | 2/1997 |
| JP | 2000-175271 | 6/2000 |

* cited by examiner

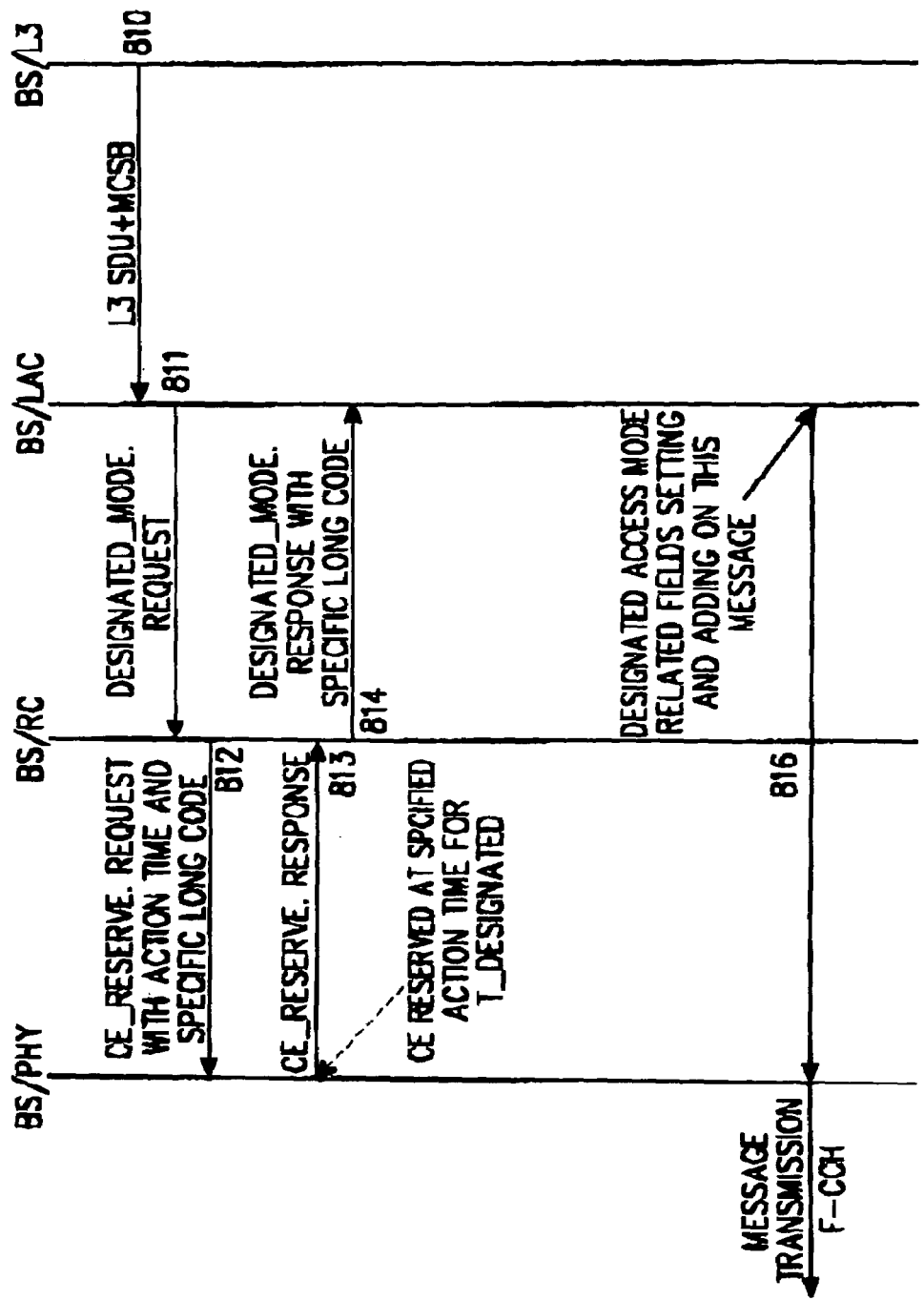

APPARATUS AND METHOD FOR DESIGNATING A REVERSE COMMON CHANNEL FOR DEDICATED COMMUNICATION IN A MOBILE COMMUNICATION SYSTEM

PRIORITY

This application claims priority to applications entitled "Apparatus and Method for Designating Reverse Common Channel to be Dedicated in Mobile Communication System" filed in the Korean Industrial Property Office on Jul. 10, 1999 and assigned Serial No. 99-27911, an application filed in the Korean Industrial Property Office on Aug. 17, 1999 and assigned serial No. 99-34013, and an application filed in the Korean Industrial Property Office on Sep. 30, 1999 and assigned serial No. 99-42136, the contents of all of which are hereby incorporated by reference.

BACKGROUND OF THE INVENTION

1. Field of the Invention

The present invention relates generally to a reverse common channel communication apparatus and method in a Code Division Multiple Access (CDMA) communication system, and in particular, to an apparatus and method for designating a reverse common channel for dedicated communication with a specific mobile station.

2. Description of the Related Art

Conventional CDMA mobile communication systems, which primarily provide voice service, have evolved into IMT-2000 standard systems. In addition to voice service, IMT-2000 systems can provide high quality voice service, moving picture service, and Internet browsing.

Data is communicated on dedicated channels and common channels in a mobile communication system. Dedicated channels and common channels are available on both the forward and reverse links. The common channels are so named because each common channel is commonly shared by a plurality of mobile stations (MSs). If more than one of the MSs attempt a call on a common channel at the same time, contention occurs, impeding reliable communications. The contention problem of common channels is more serious on the reverse link than on the forward link.

On the other hand, no channel contention occurs on a dedicated channel because the dedicated channel is literally dedicated to one-to-one communication between a base station (BS) and an individual mobile station. Therefore, the message transmission success rate is high on the dedicated channel.

Due to the low transmission success rate on common channels, an MS will attempt to access a BS repeatedly on a common channel. Consequently, resources are misused and inter-channel interference increases.

SUMMARY OF THE INVENTION

It is, therefore, an object of the present invention to provide an apparatus and method for communicating between a BS and an MS on common channels with an increased transmission performance in a CDMA communication system.

It is also an object of the present invention to provide an apparatus and method for designating a common channel to be dedicated for one-to-one communication between a BS and a particular MS in a CDMA communication system.

It is another object of the present invention to provide an apparatus and method for designating a reverse common channel to be dedicated as a one-to-one communication link between a BS and an MS in a CDMA communication system, where the BS transmits a control message including spreading code information required for common channel designation and information about a common power control channel to the MS, and the MS spreads user data with the designated spreading code according to the control message.

It is a further object of the present invention to provide a method for constructing messages in a BS signaling layer and interfacing between BS layers in order to designate a reverse common channel to be dedicated for one-to-one communication between a BS and a particular MS in a CDMA communication system.

It is still another object of the present invention to provide a method for constructing a message in a BS signaling layer and interfacing between BS layers in order to release a reverse common channel from a dedicated mode in a CDMA communication system.

It is yet another object of the present invention to provide a method for constructing a message in a BS signaling layer and interfacing between BS layers in order to designate a reverse common channel to be dedicated for one-to-one communication between a BS and an MS and release the reverse common channel from the designated mode in a CDMA communication system.

It is another object of the present invention to provide a method for constructing a message in a BS LAC (Link Access Control) layer and interfacing between BS layers in order to designate a reverse common channel to be dedicated for one-to-one communication between a BS and an MS in a CDMA communication system.

It is another object of the present invention to provide a method for constructing a message in a BS LAC layer and interfacing between BS layers in order to release a reverse common channel from a dedicated mode in a CDMA communication system.

It is another object of the present invention to provide a method for constructing a message in a BS LAC layer and interfacing between BS layers in order to designate a reverse common channel to be dedicated for one-to-one communication between a BS and an MS and release the reverse common channel from the dedicated mode in a CDMA communication system.

It is another object of the present invention to provide a method for constructing a message in a BS MAC (Medium Access Control) layer and interfacing between BS layers in order to designate a reverse common channel to be dedicated for one-to-one communication between a BS and an MS in a CDMA communication system.

It is another object of the present invention to provide a method for constructing a message in a BS MAC layer and interfacing between BS layers in order to release a reverse common channel from a dedicated mode in a CDMA communication system.

It is another object of the present invention to provide a method for constructing a message in a BS MAC layer and interfacing between BS layers in order to designate a reverse common channel to be dedicated for one-to-one communication between a BS and an MS and release the reverse common channel from the dedicated mode in a CDMA communication system.

To achieve the above and other objects, there is provided a method of designating a reverse common channel to be dedicated in a base station of a CDMA communication system. The base station designates a reverse common channel on which to receive a response message to be dedicated when a message requiring a response message is generated, generates designated channel indicating parameters including a reverse common channel designation indicator and an action time, transmits the generated message with the designated channel indicating parameters to a mobile station, and receives a response message from the mobile station on the designated reverse common channel at the action time.

According to another aspect of the present invention, there is also provided a method of releasing a reverse common channel from a designated mode in a base station of a CDMA communication system. The base station reserves a predetermined reverse common channel as a designated channel and sets a reservation time when a messages generated that requires a response message on the reverse common channel. Then, the base station generates designated channel indicating parameters including a reverse common channel designation indicator and an action time and transmits the generated message together with the designated channel indicating parameters to a mobile station. The base station checks whether a response message has been received on the designated reverse common channel within the reservation time and releases the reverse common channel from the designated mode if the response message has been received within the reservation time or the response message has not been received when the reservation time expires.

According to a further aspect of the present invention, there is provided a method of designating a reverse common channel to be dedicated in a mobile station of a CDMA communication system. The mobile station receives a message on a forward common channel. The mobile station analyses the received forward common channel message, sets the reverse common channel to a designated mode if the received message has designated channel indicating parameters that includes a reverse common channel designation indicator and an action time for designation, and generates a response message for the received message. Then, the mobile station designates the reverse common channel to be dedicated by assigning a designated channel spreading code to the reverse common channel and transmits the response message on the designated reverse common channel at the action time.

BRIEF DESCRIPTION OF THE DRAWINGS

The above and other objects, features and advantages of the present invention will become more apparent from the following detailed description when taken in conjunction with the accompanying drawings in which:

FIG. 8B illustrates a BS message transmission procedure for reverse common channel designation in the BS LAC layer in case the BS LAC layer requests a channel element (CE) from a reserved state according to a second embodiment of the present invention;

DETAILED DESCRIPTION OF THE PREFERRED EMBODIMENT

Preferred embodiments of the present invention will be described hereinbelow with reference to the accompanying drawings. In the following description, well-known functions or constructions are not described in detail since they would obscure the invention in unnecessary detail.

The present invention is intended to provide an apparatus and method for designating a reverse common channel to be dedicated for one-to-one communication between a BS and an MS in a CDMA communication system, covering the structure of a message generated from layer 3 of the BS, inter-layer interfacing, the structure of a message generated from the MS in response to a received message, and a communication method between the BS and the MS. Designation of a reverse common channel to be dedicated can be implemented in a LAC (Link Access Control) layer as well as in a signaling layer described in the preferred embodiments of the present invention. When message fields are formed not by the signaling layer but by the LAC layer, the layers may be interfaced in a different manner.

The preferred embodiments of the present invention provides an apparatus and method for designating a reverse common channel to be dedicated and an inter-protocol layer interfacing method. For this purpose, a BS transmits a control message on a forward common channel to an MS. This control message includes long code information representing the spreading code for common channel designation and common power control channel information. The MS responds to the control message with a response message. In this case, the reverse common channel designation relieves the MS of the constraint of competing with other MSs for access to the common channel. In the preferred embodiments of the present invention, reverse common channels include a reverse access channel (R-ACH), a reverse common control channel (R-CCCH), and a reverse enhanced access channel (R-EACH).

The reverse common channel designation ensures a rapid response time in transmitting a message on a designated reverse common channel, increases the transmission success rate of the reverse common channel, and reduces inter-channel interference caused by message re-transmission. Further, it decreases the number of fields added by an MS LAC layer, thereby reducing errors that occur during message transmission.

Now, the preferred embodiments of the present invention will be described in detail with reference to the attached drawings.

Figure 1:
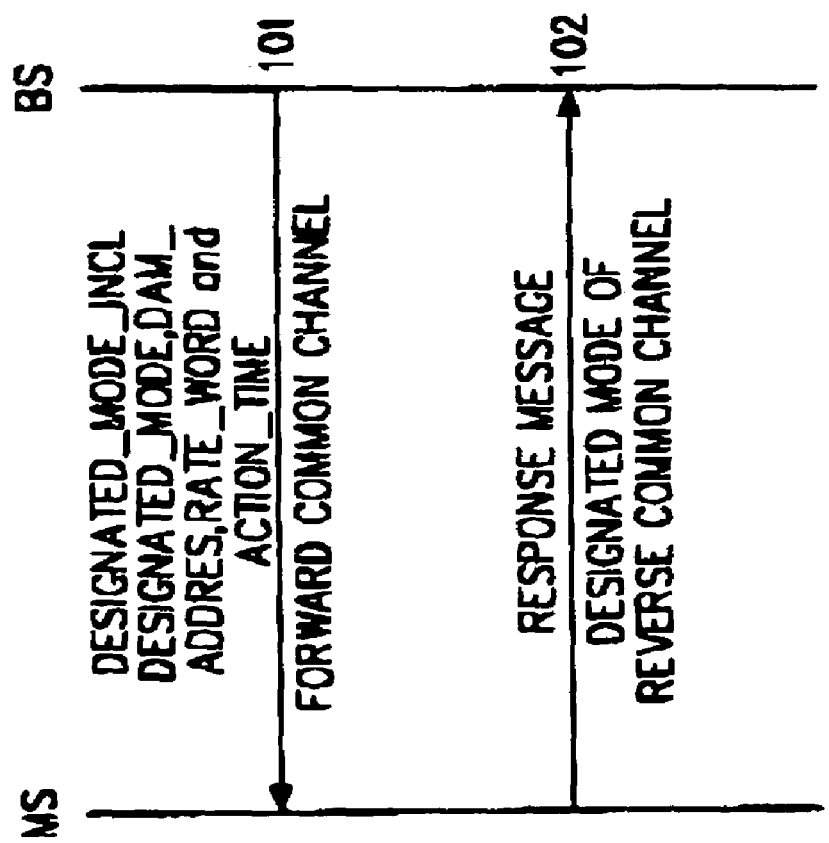
FIG. 1 is a signal flow in a basic procedure of designating a reverse common channel to be dedicated according to an embodiment of the present invention.

FIG. 1 illustrates the signal flow between the BS and the MS in a common channel designating procedure for the case that the BS requests that the MS designate a common channel to be dedicated and the MS receives a message including parameters necessary for common channel designation from the BS, according to the preferred embodiments of the present invention. The parameters include designated channel indication including field (DESIGNATED_MODE_INCL), a designated channel indicator (DESIGNATED_MODE), the address of a common power control channel (DAM_ADDRESS: Designated Access Mode_Address), the data rate (RATE_WORD), and the action time (ACTION_TIME). Here, the action time may be added to a message or preset in a system. When the action time is added to a message for transmission, the message may be a common channel designating message or an access parameter message.

Therefore, when the BS is to designate a common channel to be dedicated for one-to-one communication with a particular MS, it transmits a message with message fields including the above parameters constructed by a BS L3, LAC, or MAC layer to the MS on a forward common channel. Then, the MS analyses the message. If the MS confirms that the message includes the designated channel indicating parameters, it designates a reverse common channel to be dedicated according to the parameters and step 102. The response message may be a response to the received message or a user data traffic message. Since user traffic data is transmitted after common channel designation, the user data traffic message, if it is longer than a frame length supported by a physical layer, is segmented prior to transmission. For designation of the reverse common channel, the MS may use an ESN (Electronic Serial Number) mask, a private long code mask, or a specific R-CCCH long code mask assigned to a specific MS by a BS through prior scheduling. When the scheduled R-CCCH mask is used, the MS constructs the mask using the address of a common power control channel that is referred to for designation of a reverse common channel.

A description will be made of a reverse common channel designating method in signaling layer L3, LAC layer, or MAC layer of the BS.

Table 1 lists exemplary messages transmitted from the BS to the MS on a forward common channel. Upon receipt of these messages, the MS should transmit response messages for the messages to the BS on a reverse common channel. In the preferred embodiments of the present invention, the BS includes the designated channel indicating parameters in the messages shown in Table 1 and the MS transmits corresponding response messages to the BS after designating the reverse common channel based on the designated channel indicating parameters, by way of example.

TABLE 1

| Message Title on f-csch |
| --- |
| Status Request Message |
| TMSI Assignment Message |
| General Page Message |
| SSD Update Message |
| Authentication Challenge Message |
| Base Station Challenge Confirmation Order |
| Extended Release Message |
| Service Redirection Message |
| Data Burst Message |
| Service Release Message |
| Order Message |

Referring to Table 1, if the BS transmits a status request message to the MS on a forward common signaling channel (f-csch), the MS transmits a status response message to the BS on a reverse common signaling channel (r-csch). When the MS transmits the exemplary messages of Table 1 on a reverse common channel in the conventional mobile communication system, the messages may not reach the BS reliably and thus need to be retransmitted. The retransmission may incur interference with other MSs. However, transmission performance can be increased by designating the reverse common channel to be dedicated and transmitting the messages on the designated reverse common channel according to the preferred embodiment of the present invention.

To designate the reverse common channel, the BS's L3, LAC, or MAC layer adds designated channel indicating parameters shown in Table 2 to the forward channel messages of Table 1, according to the preferred embodiments of the present invention.

TABLE 2

| Field | Length |
| --- | --- |
| DESIGNATED_MODE_INCL | 1 |
| DESIGNATED_MODE | 1 |
| DAM_ADDRESS | 0 or 6 |
| RATE_WORD | 0 or 3 |

Though not shown in Table 2, the action time is added to the messages shown in Table 1 or preset in the system. If the action time is added to a message, a BS signaling layer or LAC layer adds it. On the other hand, if the system presets the action time, the system estimates time when a message is transmitted from an MS, considering the time required for transmission of a message on a common channel to an MS, that is, propagation time delay and message processing time. The action time may be added to a common channel designation request message or an access parameter message. If the action time is added to the access parameter message, the MS receives it when it access the system and stores it. When the MS receives a common channel designation command, it transmits a message to the BS based on the stored action time.

The designated channel indicating parameter fields include the four parameters (or action time in addition) shown in Table 2. In Table 2, DESIGNATED_MODE is a field that orders the MS to designate a common channel to be dedicated, the field DAM_ADDRESS represents the address of a common power control channel, i.e., the index of the common power control channel that is referred to for control of the transmission power of a message to be transmitted after common channel designation and the field RATE_WORD indicates the transmission rate of a designated reverse common channel. The LAC layer adds a field Action_Time to notify the MS of the time to transmit a response message after the MS receives an exemplary message as shown in Table 1. The BS adds the two fields when it transmits a particular message or requests the MS to transmit a response message on the designated common channel.

For designation of the common channel to be dedicated, the corresponding MS should use a predetermined long code in spreading the reverse common channel and the BS should reserve a channel element to receive the reverse channel signal spread with the spreading code.

Figure 9A:
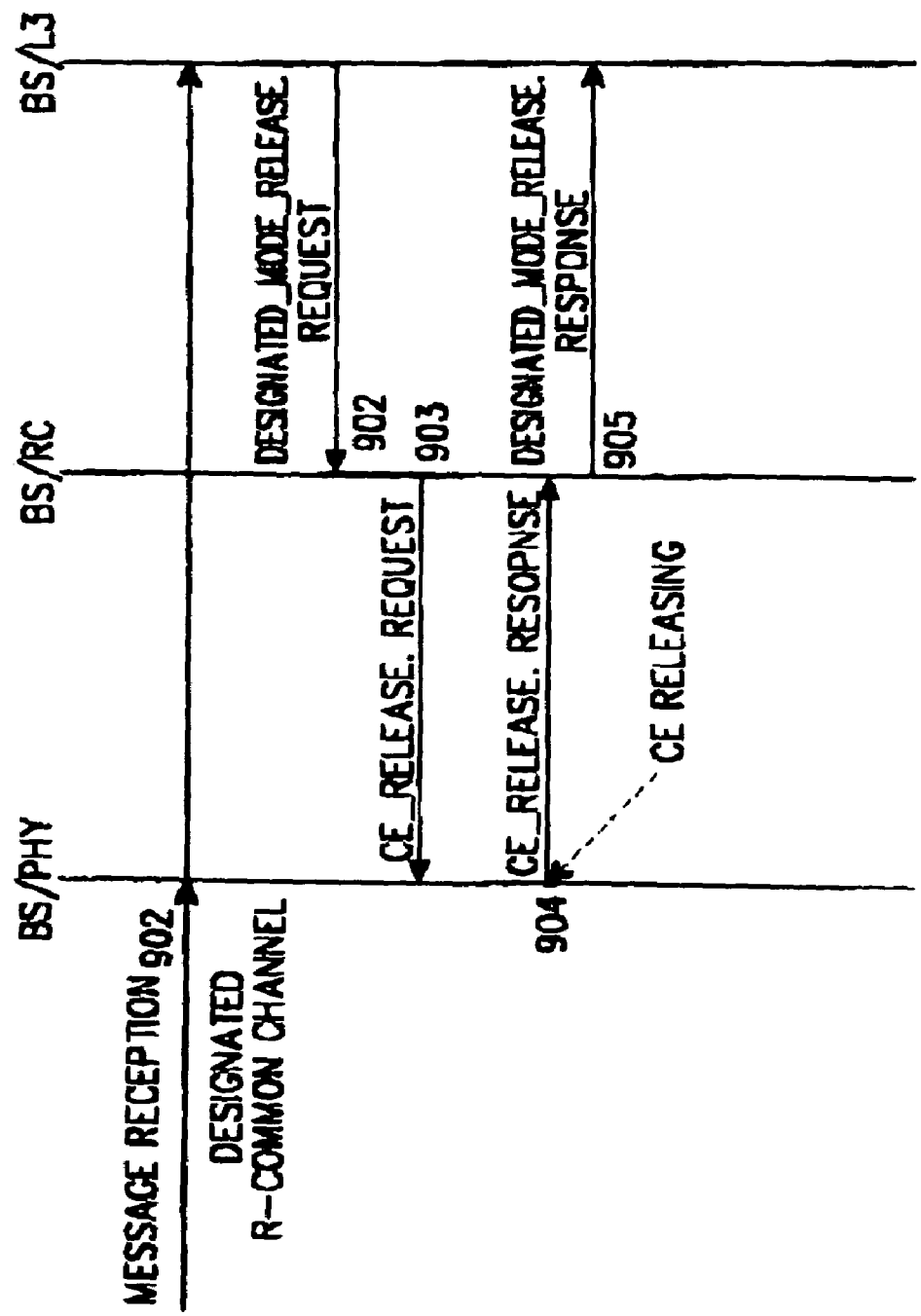
FIG. 9A illustrates a BS message reception procedure for reverse common channel designation in the BS LAC layer in case the signaling layer (L3) requests release of the CE from a reserved state according to a second embodiment of a present invention.
Figure 9B:
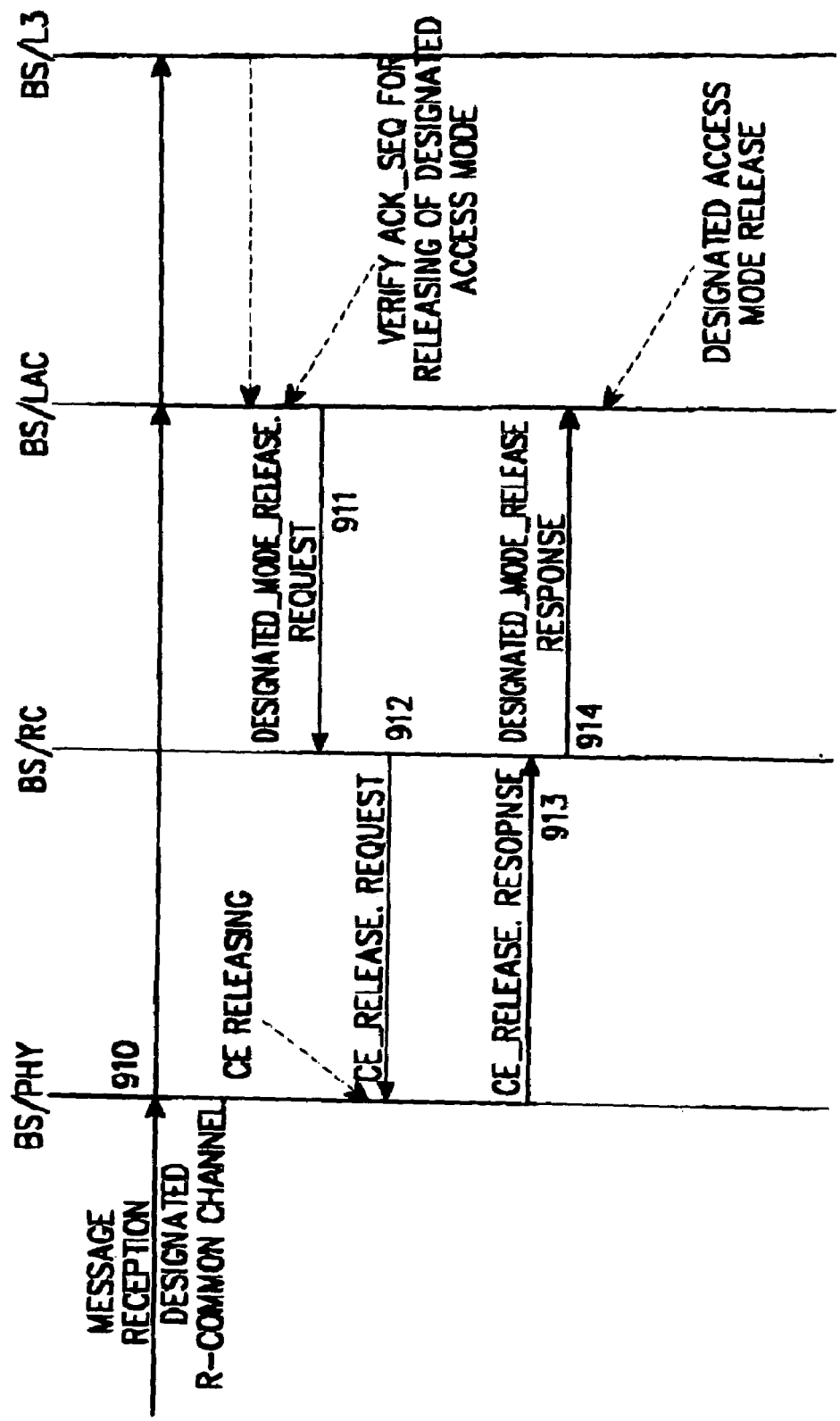
FIG. 9B illustrates a BS message reception procedure for reverse common channel designation in the BS LAC layer in case the BS LAC layer requests release of the CE from a reserved state according to a second embodiment of the present invention.
Figure 10:
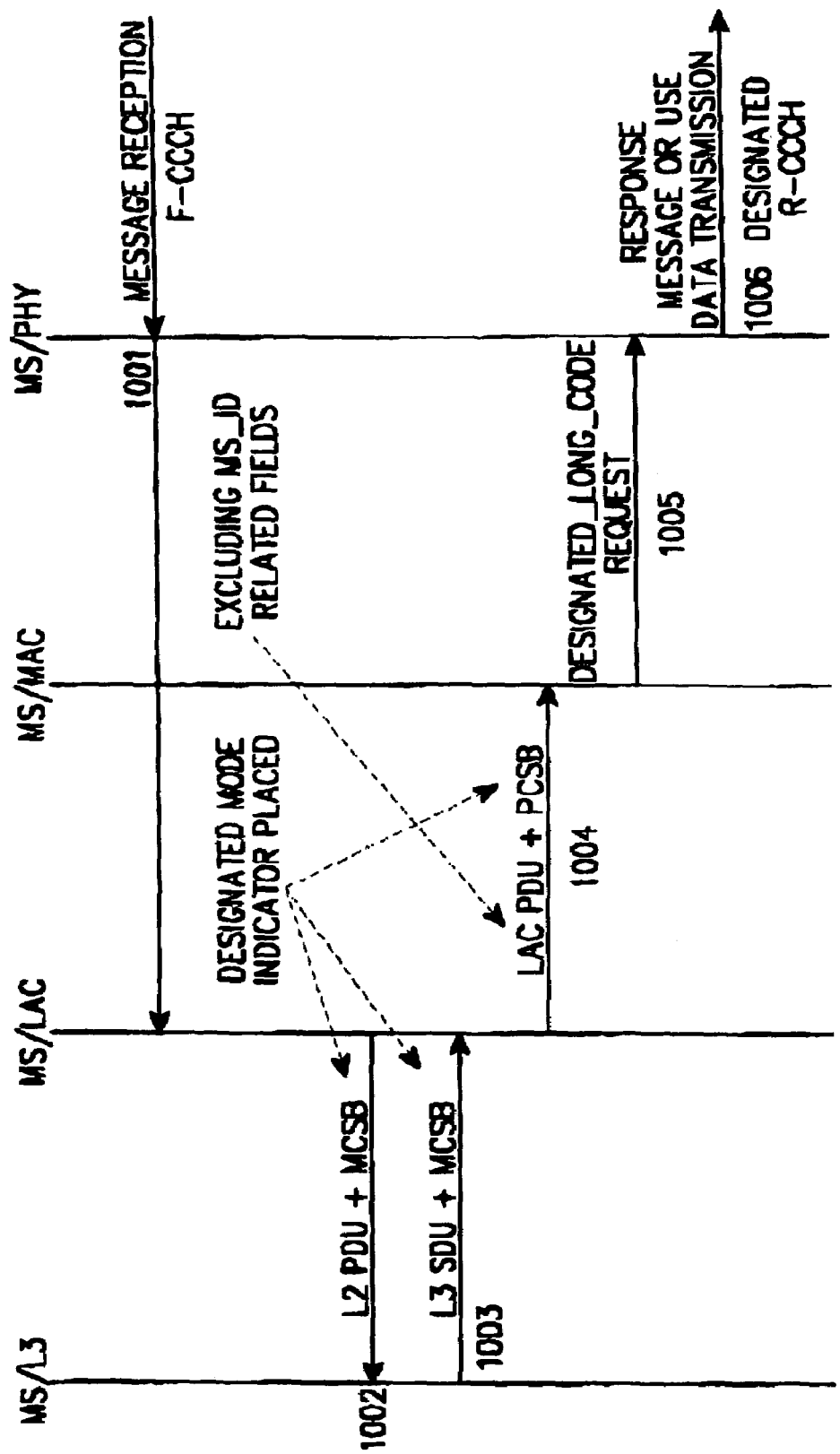
FIG. 10 illustrates an MS message transmission and reception procedure for reverse common channel designation according to a second embodiment of the present invention.
Figure 11:
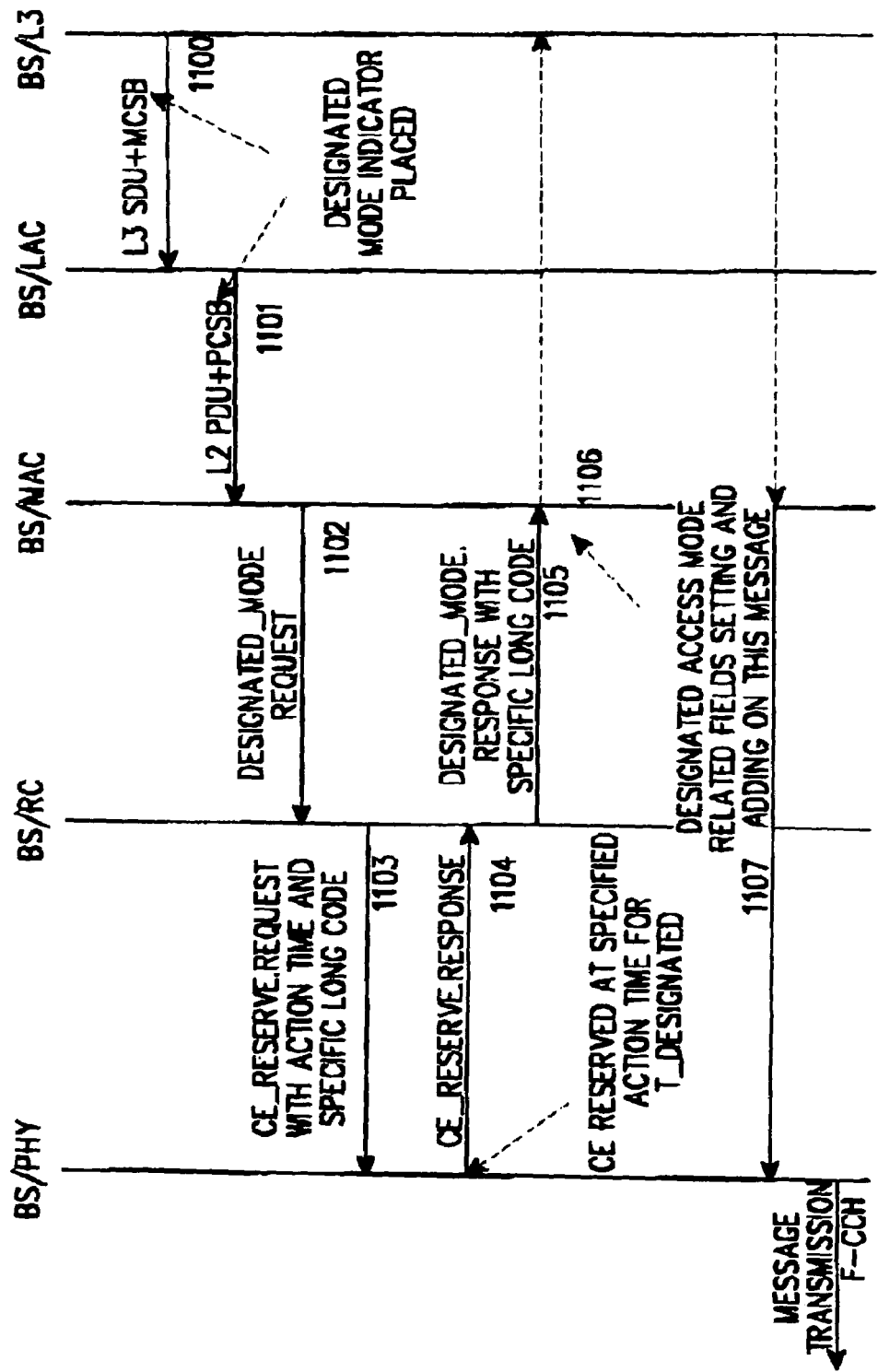
FIG. 11 illustrates a BS transmission procedure for reverse common channel designation in a BS MAC layer according to a third embodiment of the present invention.
Figure 12:
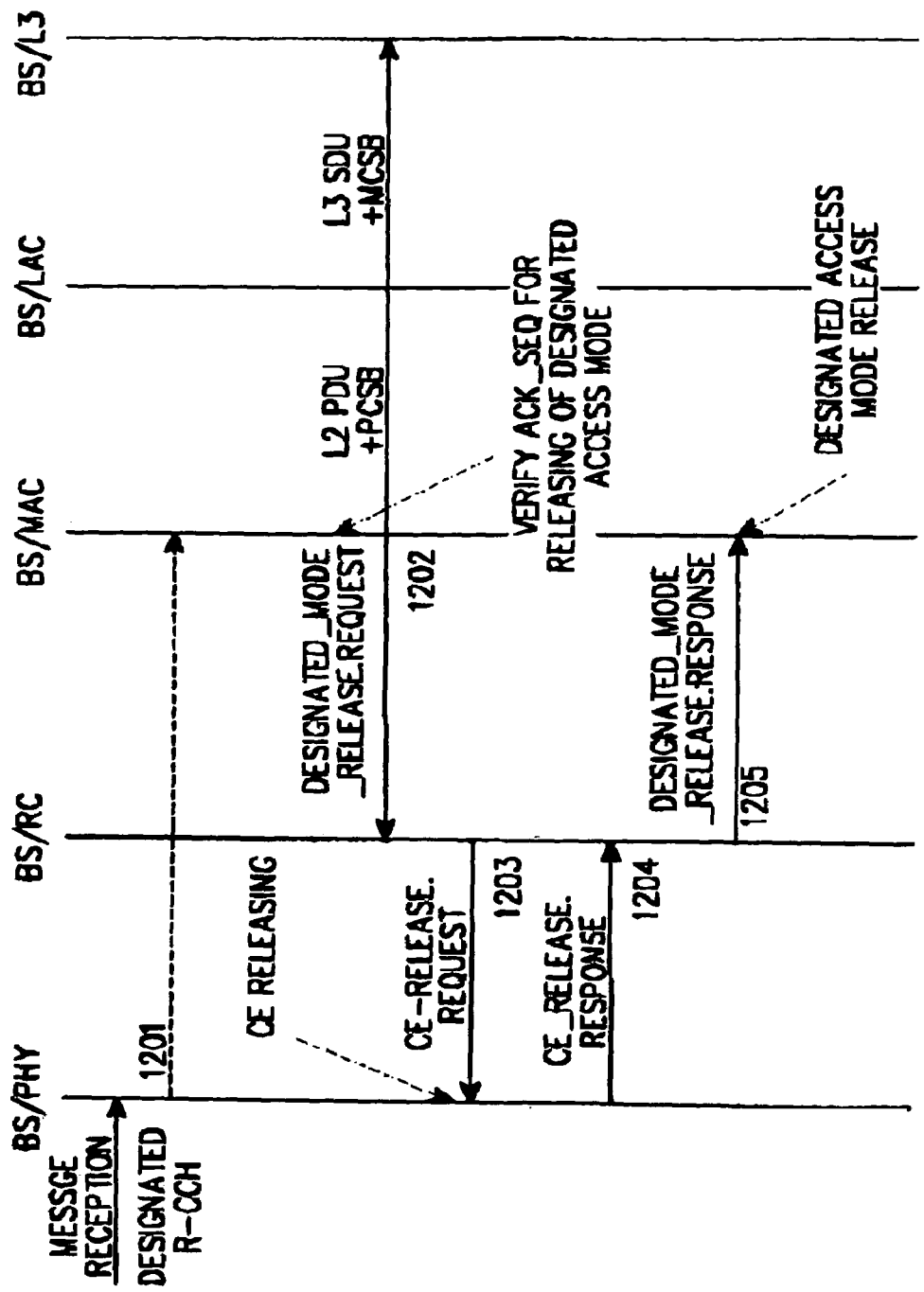
FIG. 12 illustrates a BS reception procedure for reverse common channel designation in the BS MAC layer according to a third embodiment of the present invention.
Figure 13:
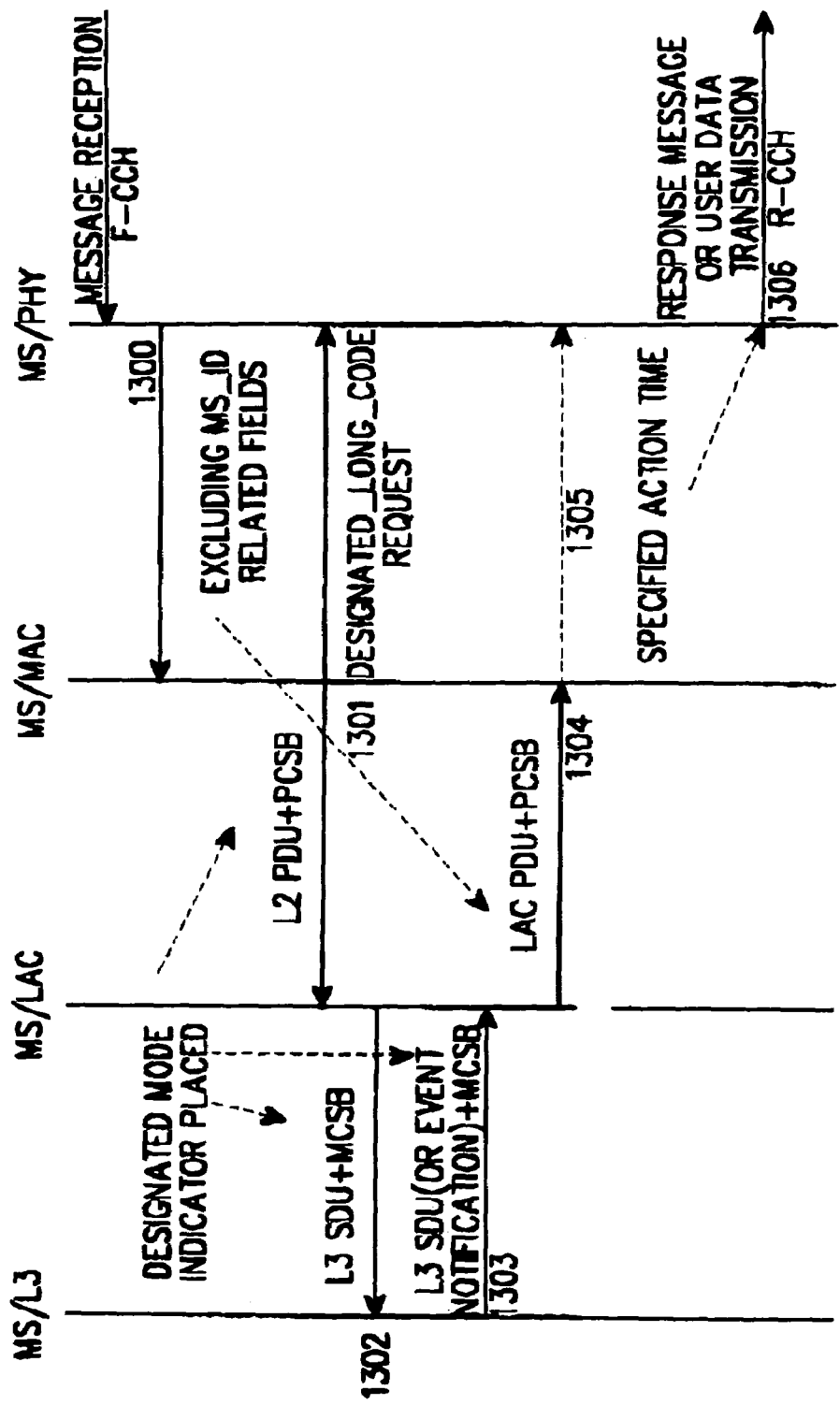
FIG. 13 illustrates a signal communication procedure on a designated reverse common channel in an MS MAC layer according to a third embodiment of the present invention.

FIGS. 2 to 7 illustrate procedures of designating a reverse common channel in a BS L3 and an MS L3 according to a first embodiment of the present invention, FIGS. 8A to 10 illustrate procedures of designating a reverse common channel in a BS LAC layer and an MS LAC layer according to a second embodiment of the present invention, and FIGS. 11, 12, and 13 illustrate procedures of designating a reverse common channel in a BS MAC layer and an MS MAC layer according to a third embodiment of the present invention.

Figure 2:
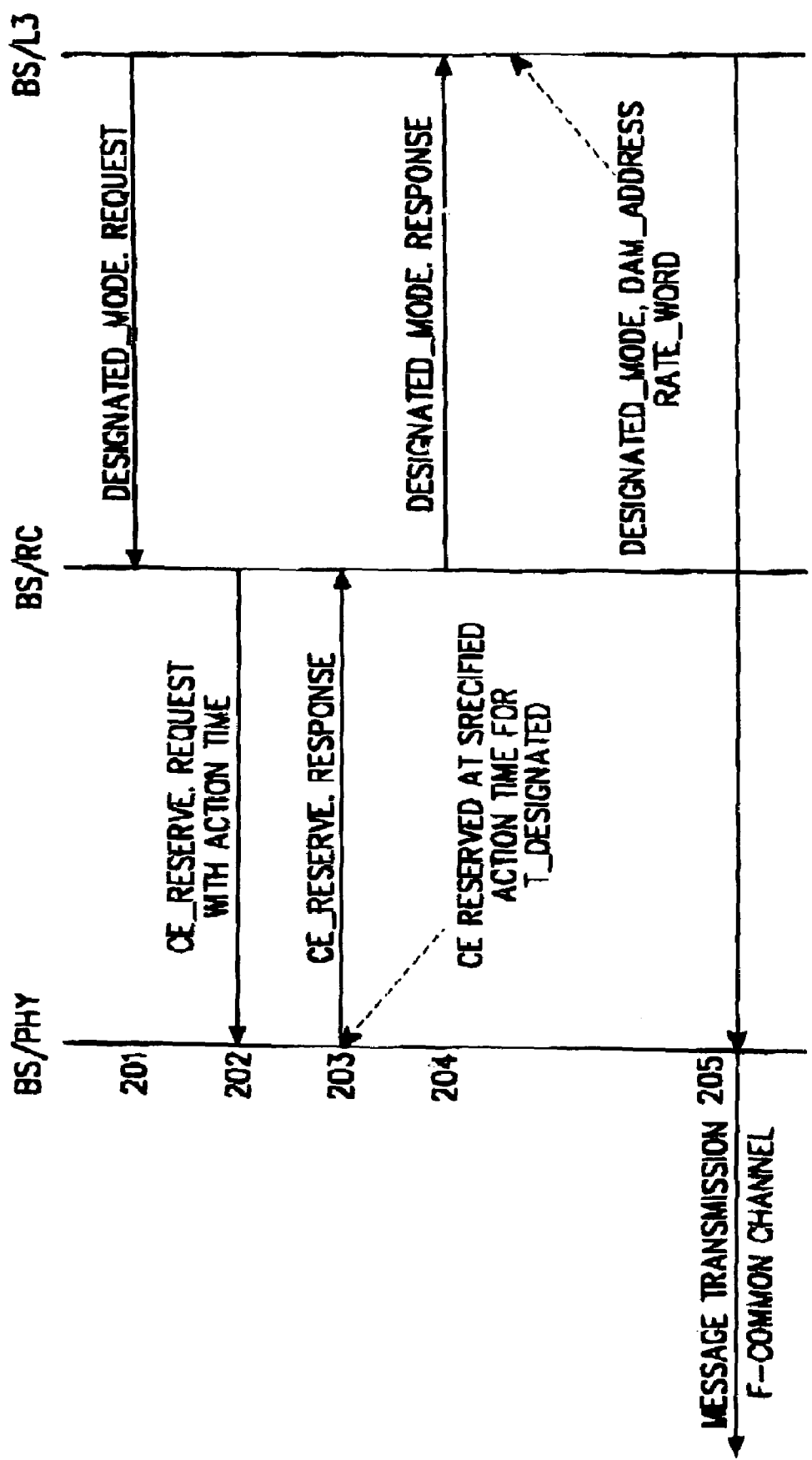
FIG. 2 is a signal flow in a BS message transmission procedure for designation of a reverse common channel according to a first embodiment of the present invention.

FIG. 2 is the signal flow in a procedure for adding information about the reverse common channel designation in the BS signaling layer, according to a first embodiment of the present invention.

Referring to FIG. 2, layer 3 (L3) of the BS requests reservation of a channel element before designation of the common channel in step 201, as stated above. That is, the BS L3 requests a designated mode to be set to designate the reverse common channel to be dedicated if the BS is to transmit a message that requires a response message from the MS. The designated mode can be set to designate the reverse common channel even when the BS is to transmit a message that acknowledges designation among response-requiring messages. Here, the f-csch messages listed in Table 1 require response messages from the MS. When a response message should be received on a designated reverse common channel, the BS L3 outputs a mode signal (Designated_Mode) requesting reservation of channel resources.

Upon receipt of the channel element reservation request from the BS L3, the resource controller (RC) of the BS transmits a channel element reservation request signal including reservation action time (CE_Reserve. Request with Action Time) to the physical layer (PHY) of the BS in step 202. The action time may be added to a message directed to the MS or preset in the system.

Action Time is set to an appropriate value considering the time until the BS receives a response message from the MS after the MS receives a forward common channel message from the BS. Action Time is added in a LAC layer of the BS. The LAC layer adds one bit for USE_TIME and 6 bits for ACTION_TIME to set Action Time. The duration (T_designated) of the channel element reserved state is also set to prevent continuous occupation of the channel element and misuse of resources in case the BS fails to receive the response message within a predetermined time. The reservation duration can be set in consideration of time required for transmission of the forward common channel message, time required to process the forward common channel message in the MS, and time taken for other related operations.

The reservation duration, set in step 203 of FIG. 2, is necessary in case that the MS does not recognize the forward common channel message transmitted from the BS and thus cannot transmit a response message to the BS. Thus, the channel element starts to operate at the action time and the channel reserved state lasts for a time period set in a reservation timer (T_designated). If the BS fails to receive the required response message when the reservation timer expires, it automatically releases the channel element from the reserved state in order to prevent the dissipation of resources caused by the continuous reservation of the channel element. Thus, the timer should be set to an appropriate value.

In step 203, the PHY notifies the RC of information about channel element reservation. If it is not possible to reserve the channel element, the PHY generates a signal indicating "reservation unavailable" and the timer value is not set. If the channel element has been reserved, the PHY generates a reservation complete signal.

In step 204, the RC transmits a received from the PHY to the L3. The BS transmits the thus-constituted message to the MS on the forward common channel in step 205. The DESIGNATED_MODE is set to 1 in the message as an indicator that orders the MS to spread the reverse common channel with a paraticular long code like the ESN of the MS.

If the L3 receives a signal indicating "reservation unavailable" in step 204, it sets DESIGNATED_MODE to 0 and omits the fields DAM_ADDRESS and RATE_WORD). In this case, the LAC layer does not add USE_TIME and ACTION_TIME either. This implies that the corresponding reverse common channel assumes the same characteristics as a conventional reverse channel. On the other hand, if the L3 receives a reservation acknowledgment signal in step 204, the L3 sets DESIGNATED_MODE to 1, writes the address of a common power control channel for reference in the field DAM_ADDRESS, and writes information about the data rate of a designated channel in the field RATE_WORD. The LAC layer adds the field USE_TIME and ACTION_TIME.

Figure 5:
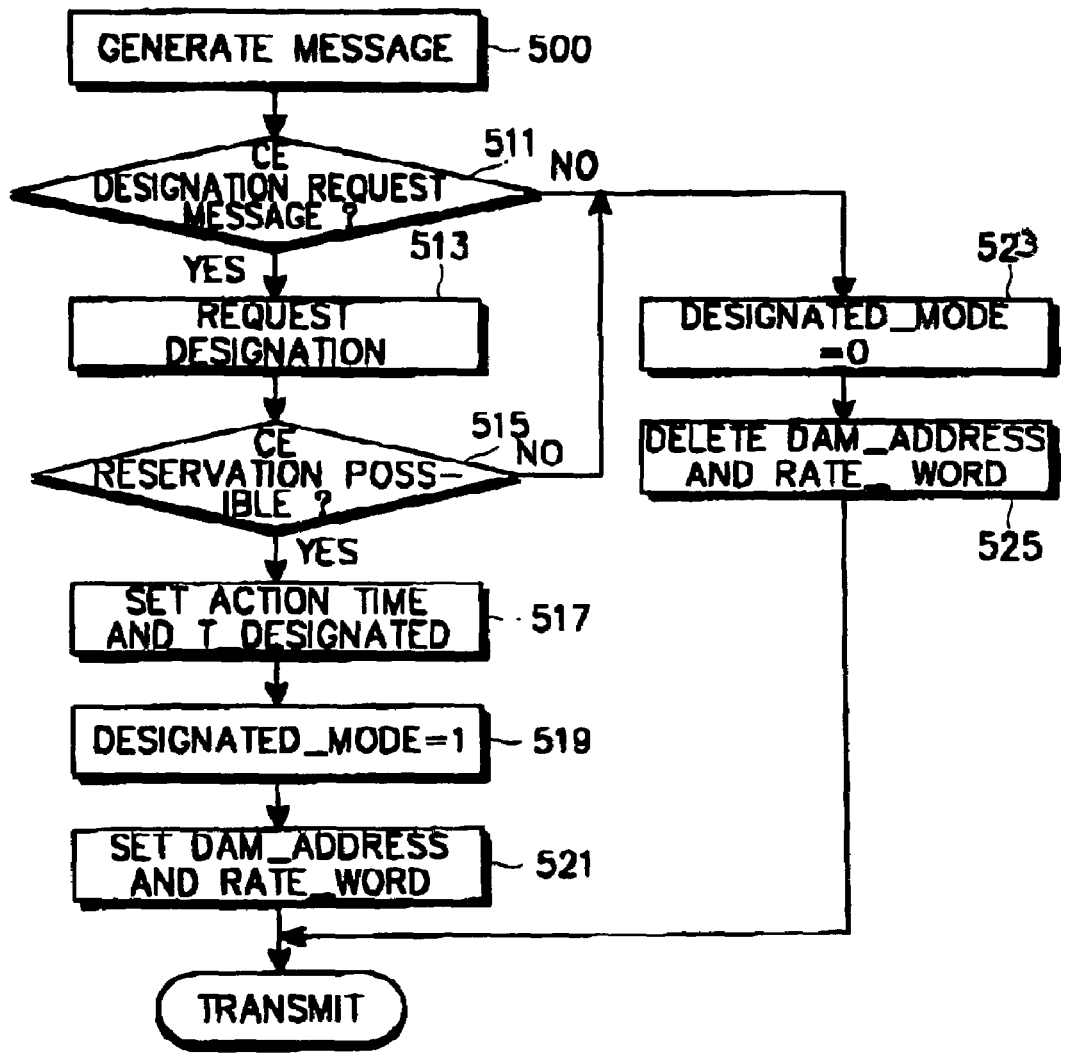
FIG. 5 is a flowchart illustrating the BS message transmission procedure shown in FIG. 2 according to a first embodiment of the present invention.

FIG. 5 is a flowchart illustrating the reverse common channel designation procedure of FIG. 2 in the BS.

Referring to FIG. 5, if a forward common channel message is generated in step 500, the BS checks whether the message is used for reverse common channel designation in step 511. If the message is a designation request message, the BS requests designation in step 513. Then the BS checks whether there is an available channel to be reserved in step 515. If channel reservation is possible, the BS reserves the channel and sets Action Time and T_designated in step 517. Action Time indicates a time point when the MS transmits the reverse common channel message and T_designated is a time period for which the BS awaits receipt of a response message from the MS on a reverse common control channel. Then, the BS generates the designated channel indicating parameters shown in Table 2 in steps 519 and 521. The parameters include DESIGNATED_MODE, DAM_ADDRESS and RATE_WORD. To designate the reverse common channel, the BS sets DESIGNATED_MODE to 1 for designating the reverse common control channel at step 519, and the other parameters for setting the transmission power and transmission rate of the reverse common control channel to corresponding values in step 521. Then, the three parameters are added to one of the messages listed in Table 1 and transmitted at the designated action time on the forward common control channel.

If the generated message is not a designation request message in step 511 or there is no channel element to be reserved in step 515, the BS sets DESIGNATED_MODE to 0 in step 523, deletes the other parameter fields in step 525, and transmits the message on the forward common channel.

After transmitting the message (requiring a response from the MS) on the forward common channel, the BS awaits receipt of the response message from the MS for the time T_designated.

Figure 3:
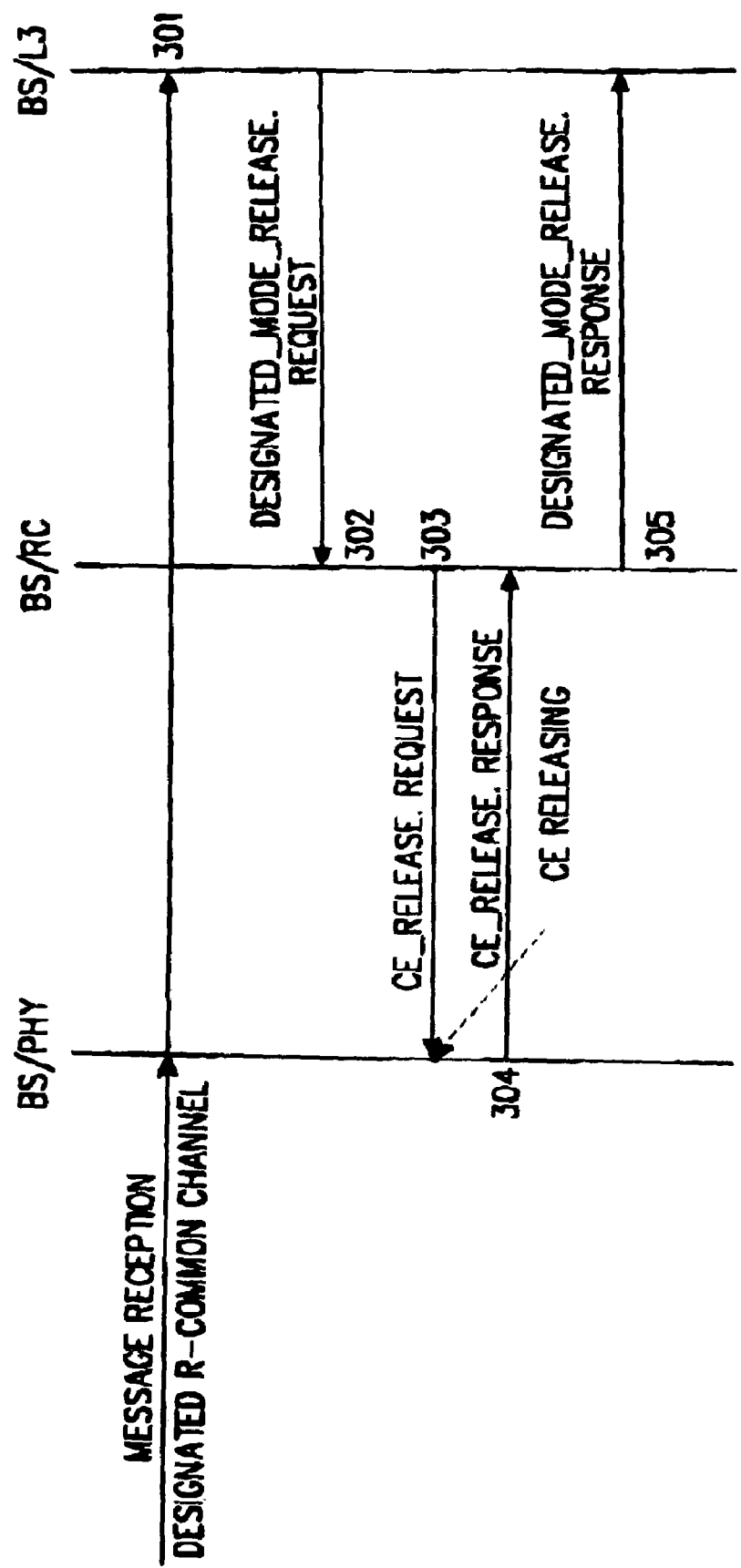
FIG. 3 is a signal flow in a BS message reception procedure for releasing the reverse common channel from a designated mode according to a first embodiment of the present invention.

FIG. 3 is the signal flow within the BS when the BS receives the response message for the transmitted forward common channel message including information about the reverse common channel from the MS on the designated reverse common channel, according a first embodiment of the present invention.

Referring to FIG. 3, the L3 of the BS receives the response message from the MS on the designated reverse common channel in step 301. If the reverse common channel has not been designated, the BS has, in effect, received the message on a conventional access channel.

In step 302, the L3 receives the response message from the MS and notifies the RC of the reception in order to release the dedicated reverse common channel in accordance with the response message (Designated_Mode_Release, Request).

In step 303, the RC notifies the PHY that the reverse common channel should be released from the designated mode. Then, the PHY demodulates the designated reverse common channel spread with a unique MS long code, (e.g., an ESN) and releases the reservation of the channel element In step 304, the PHY notifies the RC that the reservation of the channel element has been released. Then, the RC notifies the L3 of the release of the channel element from the reserved state, thereby wholly releasing the reverse common channel from the designated mode, in step 305.

As described above, for a communication between a BS and a specific MS on a designated reverse common channel, a channel element is reserved and the reservation duration of the channel element is set. If the reserved channel element is available, the BS transmits designated channel indicating parameters to the MS on a forward common channel at a designated action time. The designated channel indicating parameters is added to one of the forward common channel messages shown in Table 1 that require response messages on a reverse common channel and includes the designated channel indicating parameters of DESIGNATED_MODE, DAM_ADDRESS, and RATE_WORD as shown in Table 2. DESIGNATED_MODE may be one bit. If this field is set, a spreading that designates the reverse common channel is generated. Here, the BS and the MS control a preset dedicated long code to be generated for the reverse common channel. The spreading code can be a long code generated using the ESN mask of the MS, a public long code mask, or a predetermined long code for common channel designation.

Table 3 shown below lists message fields added by a LAC layer of the MS when the MS transmits the response message on the designated reverse common channel, where message fields labeled with M are always included in a message and message fields labeled with O can be omitted when a reverse common channel is designated. The messages shown in Table 3 are LAC layer messages transmitted from the MS after reverse common channel designation.

TABLE 3

| Field | Basic Mode | Designated Mode | Length [bit] |
|---|---|---|---|
| MSG_TYPE | M | M | 8 |
| ACK_SEQ | M | M | 3 |
| MSG_SEQ | M | M | 3 |
| ACK_REQ | M | M | 1 |
| VALID_ACK | M | M | 1 |
| ACK_TYPE | M | M | 3 |
| MSID_TYPE | M | O | 3 |
| MSID_LEN | M | O | 4 |
| MSID | M | O | 8 × MSID_LEN |

(M: Mandatory, O: Optional)

In Table 3, the LAC layer adds the fields listed under Basic Mode when the MS is to transmit the response message on the reverse common channel. Because the common channel is commonly shared by a plurality of MSs, the MS should transmit its address to the BS so that the BS can identify the MS. Therefore, MSID_TYPE, MSID_LEN, and MSID are of necessity added. However, if the reverse common channel is designated to be dedicated to the specific MS, the fields MSID_TYPE, MSID_LEN, and MSID that identify the MS are not necessary, as shown in the list under the Designated Mode column in Table 3. The resulting decrease in the number of fields added by the LAC layer reduces transmission errors.

MSG_TYPE provides transmission characteristics of the message. ACK_SEQ is the sequence number of the response. The BS confirms message receipt by checking the stored sequence of its transmitted message and the sequence of a received message. MSG_SEQ indicates the sequence of a transmitted message. ACK_REQ is a command requesting a response for the current message. If this field is set to 1, the BS or the MS that receives the message should transmit a response message. VALID_ACK indicates the validity of an acknowledgment and ACK_TYPE indicates termination of the acknowledgment.

As noted from Table 3, designation of a reverse common channel increases a transmission success rate and reduces inter-channel interference. Furthermore, the length of an MS-initiated message is decreased, thereby reducing message transmission errors.

Figure 4:
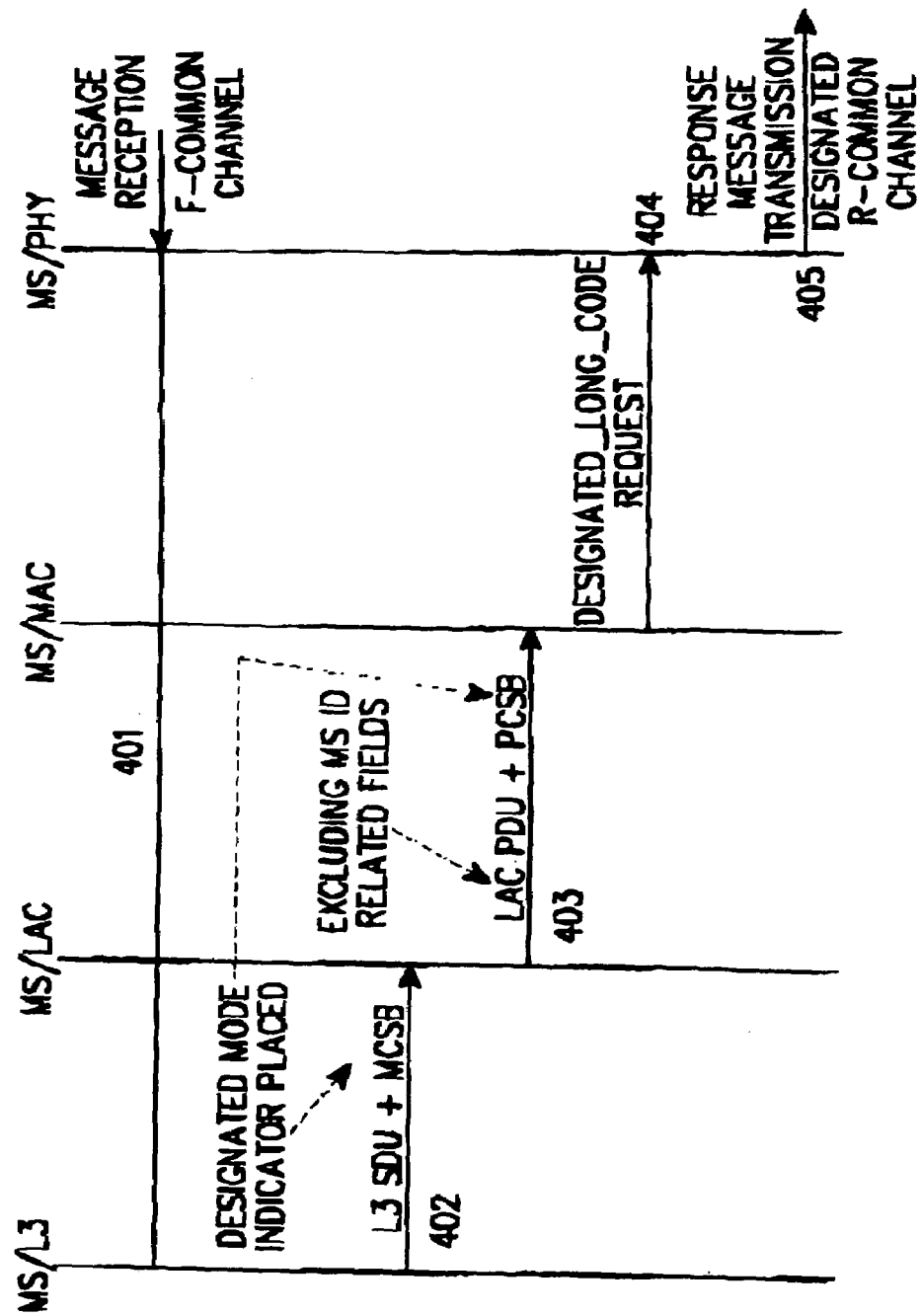
FIG. 4 is a flowchart illustrating a procedure from receipt of a message to transmission of a response message in an MS signaling layer to designate the reverse common channel to be dedicated according to a first embodiment of the present invention.

FIG. 4 is a signal flow in a response message transmission procedure in the MS after it designates a reverse common channel.

Referring to FIG. 4, the MS receives a message from the BS on the forward common channel in step 401. Upon receipt of the message including the designated channel indicating parameters on the forward common channel, a PHY of the MS transmits the received message to an L3 of the MS in step 401.

Then, the L3 recognizes the reverse common channel information included in an L3 service data unit (SDU), generates a response message for the received message, and transmits the response message to the LAC layer in step 402. Here, the L3 places a designated mode indicator requesting transmission of the response message on the designated reverse common channel in an message control status block (MCSB).

The LAC layer recognizes that the response message is to be transmitted on the designated reverse common channel from an analysis of the MSCB received together with the L3 SDU, does not add MS ID-related fields shown in Table 3, and transmits an LAC PDU (Protocol Data Unit) and PCSB (PDU Control Status Block) to a MAC (Medium Access Control) layer in step 403. The LAC PDU excludes the MS ID-related fields and the PCSB includes the designated mode indicator.

The MAC layer requests a DESIGNATED_LONG_CODE response message to be spread with a unique long code to the PHY in step 404.

The PHY generates a spreading code using an ESN mask or a private long code mask for designation of the reverse common channel and transmits the response message on the designated reverse common channel according to the command received from the MAC layer, and the MS refers to a common power control channel in transmitting the response message to the BS in step 405. The ID of the common power control channel can be detected from DAM_ADDRESS and the transmission rate of the reverse common channel is set according to RATE_WORD in the message received from the BS.

Consequently, the designated reverse common channel serves similarly as a dedicated channel.

Figure 7:
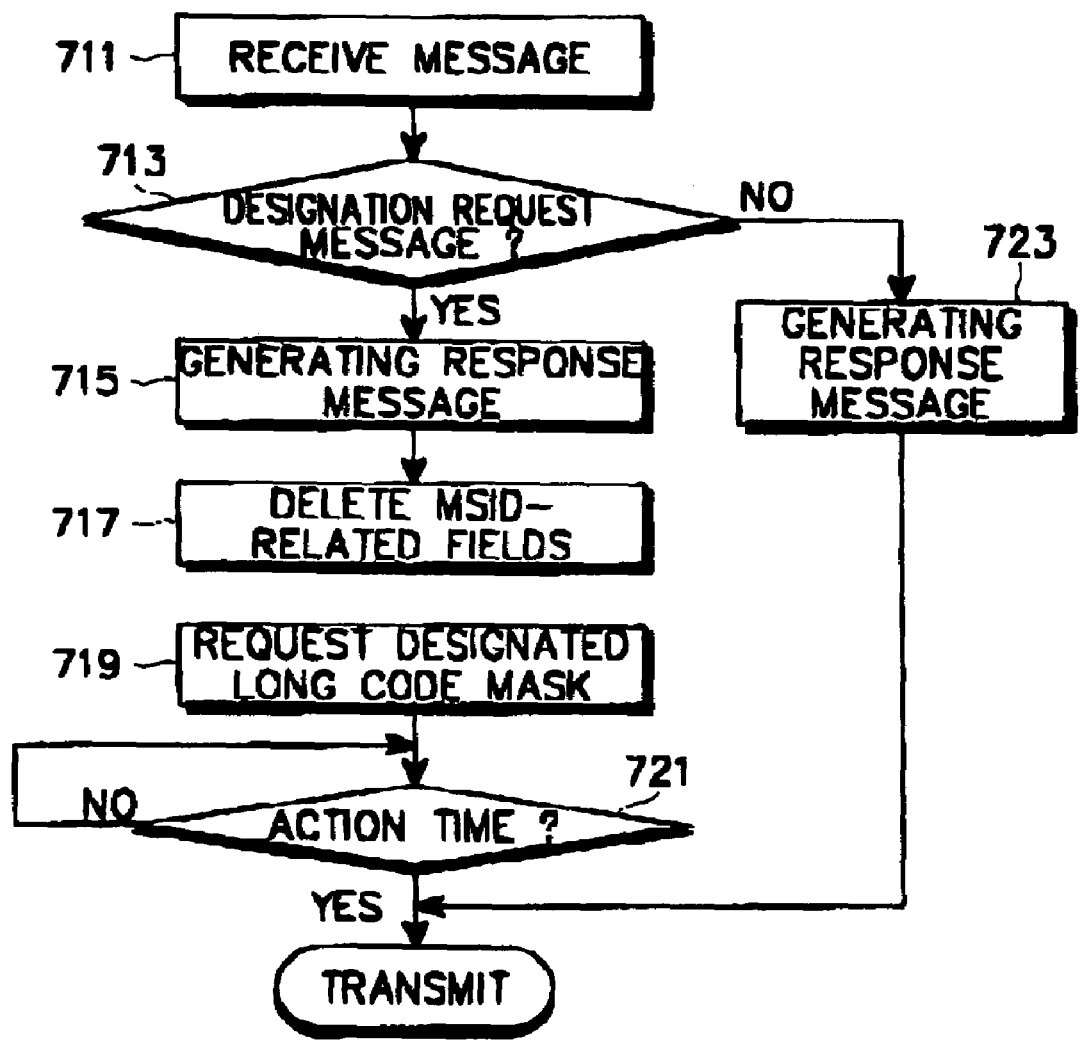
FIG. 7 is a flowchart illustrating the response message generating procedure of the MS shown in FIG. 4 according to a first embodiment of the present invention.

FIG. 7 is a flowchart illustrating the reverse common control channel message transmitting procedure of FIG. 4 in the MS.

Upon receipt of the message on the forward common control channel in step 711, the MS checks whether the received message includes the designated channel indicating parameters in step 713. If it does, the MS constructs a response message for the received message in step 715 and deletes MS ID-related fields in step 717. The MS ID-related fields are MSID_TYPE, MSID_LEN, and MS ID in Table 3. The MS requests a designated long code mask and generates a spreading code for the reverse common control channel to be designated in step 719. The designated long code mask can be an ESN long code mask, a public long code mask, or a dedicated long code mask prearranged between the BS and the MS. At an action time in step 721, the MS transmits the response message on the designated reverse common control channel. If the received message does not include the designated channel indicating parameters in step 713, the MS generates a spreading code for the reverse common control channel using a contention-based common channel long code in step 723 and transmits the response message on the reverse common channel.

Figure 6:
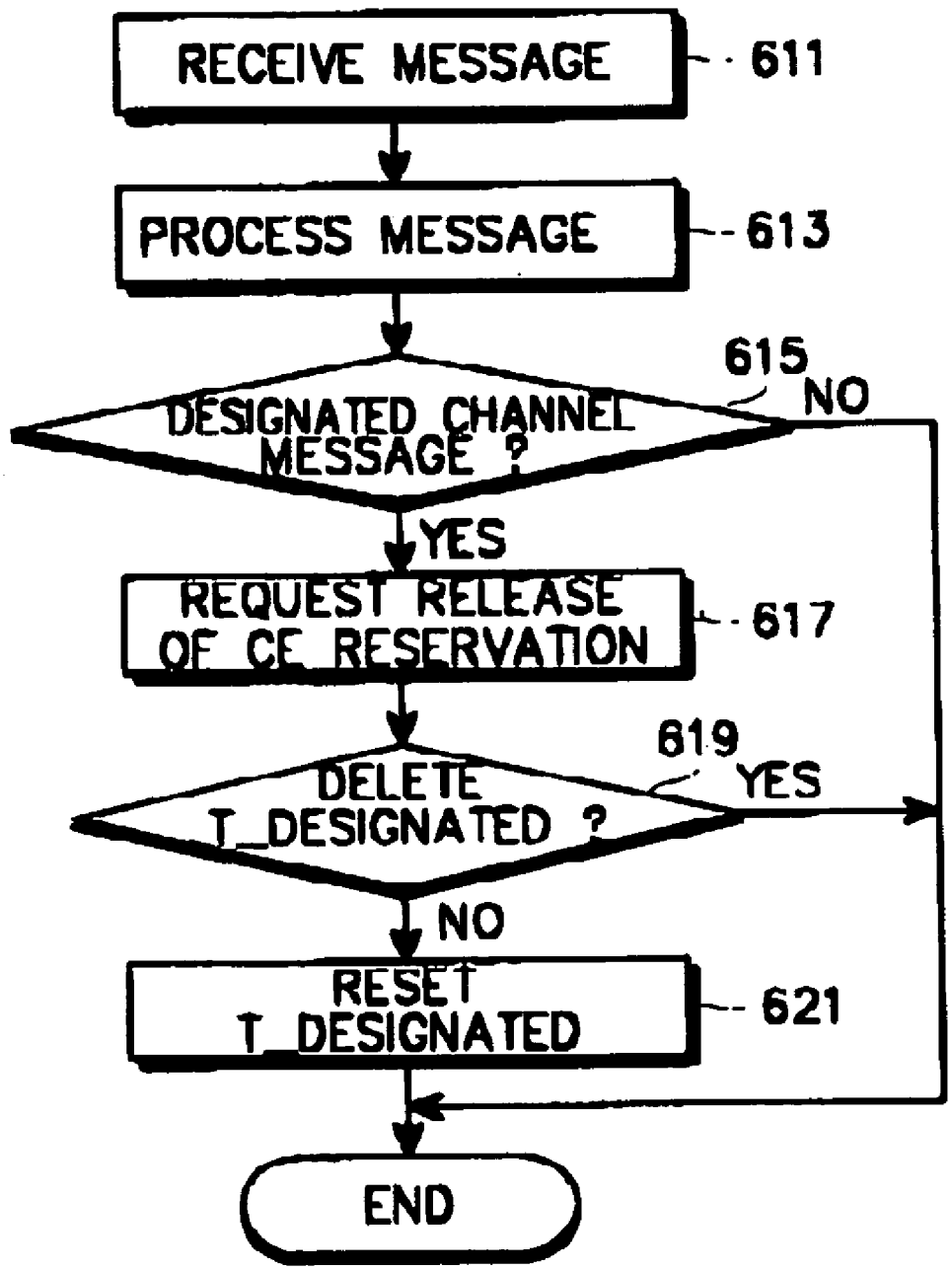
FIG. 6 is a flowchart illustrating the BS message reception procedure shown in FIG. 3 according to a first embodiment of the present invention.

After receiving the response message, the BS releases the reverse common control channel from the designated mode in the procedure shown in FIG. 3. FIG. 6 is a flowchart illustrating the procedure shown in FIG. 3

Referring to FIG. 6, upon receipt of the response message from the MS in step 611, the BS processes the received message in step 613. In step 615, the BS checks whether the message has been on the designated reverse common control channel. In the case of the designated reverse common control channel, the BS releases the reserved channel element in step 617, cancels the timer T-designated in step 619 and resets the timer in step 621.

If the BS fails to receive the response message from the MS within T_designated while the designated reverse common control channel is in use, the BS recovers resources by releasing the reserved channel element and stops the reservation time (T_designated) in order to assign the reverse designated common channel to another MS.

In accordance with the present invention, for designation of a reverse common channel, a BS transmits a control message including long code information indicating a spreading code, channel transmission rate, and information about a common power control channel to an MS. The MS spreads user data with a unique long code for the reverse common channel and transmits a response message for the control message on the designated reverse common channel. The designation of the reverse common channel to be dedicated ensures a rapid response time, increases a transmission success rate, and reduces interference between channels caused by message retransmission.

Furthermore, an MS LAC layer adds a lesser number of fields, resulting in the decrease of transmission errors.

Now, procedures of designating a common channel in the BS and the MS will be described according to a second embodiment of the present invention.

Figure 8A:
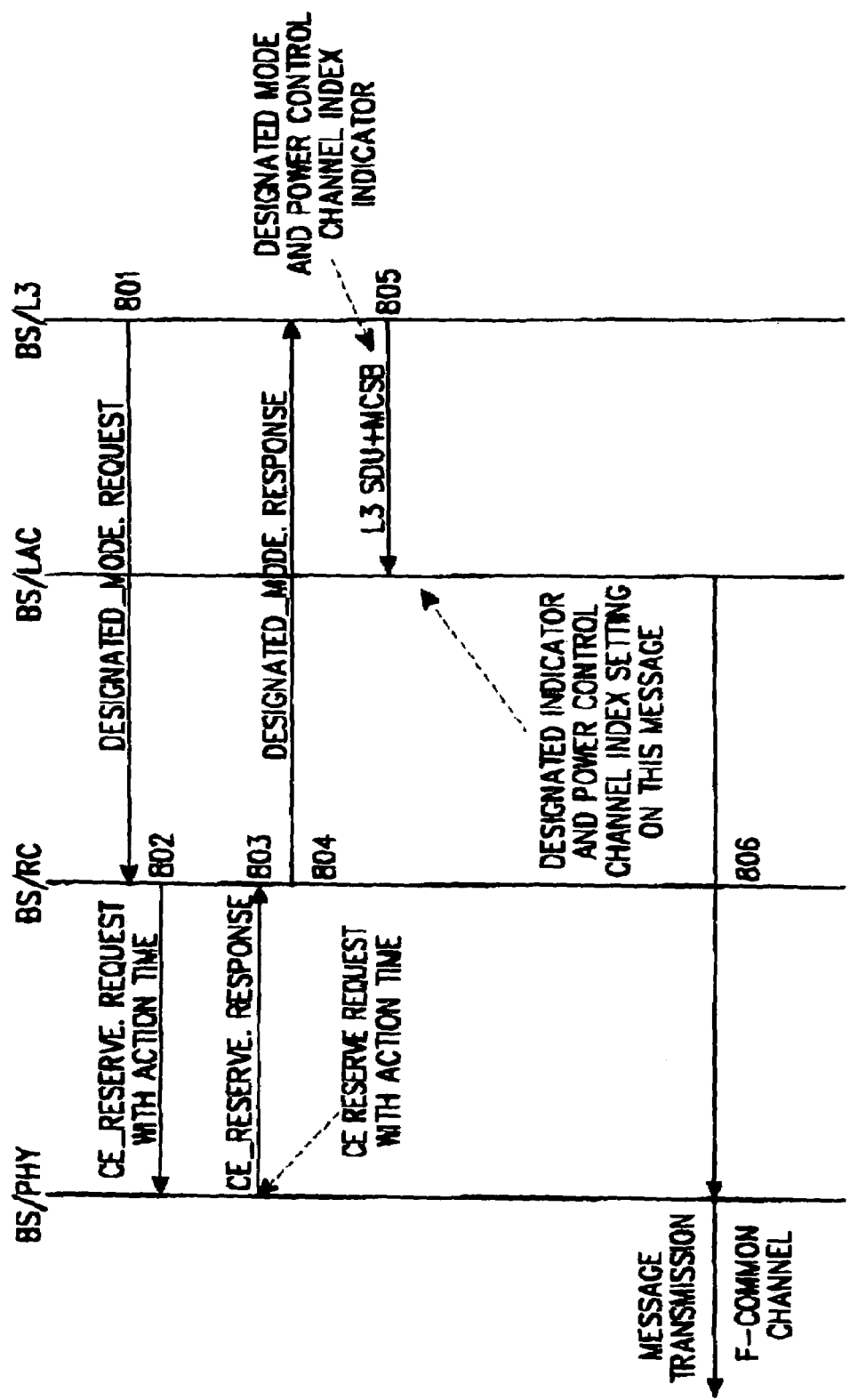
FIG. 8A illustrates a BS message transmission procedure for reverse common channel designation in a BS LAC layer in case a BS signaling layer (L3) requests a channel element (CE) from a reserved state according to a second embodiment of the present invention.

FIG. 8A illustrates a procedure of adding reverse common channel designation information in a BS LAC layer, according to a second embodiment of the present invention.

Referring to FIG. 8A, the BS reserves a CE in step 801 prior to designation of a common channel in a BS LAC layer 2 L2). When the BS allows dedicated transmission of user data traffic and the messages shown Table 1 (i.e., messages requiring a response from the MS), the L2 commands the CE to be reserved in step 801.

Upon receipt of a CE reservation request from the L2, the RC transmits a CE reservation request signal including reservation action time (CE_Reserve. Request with Action Time) to the PHY of the BS. The action time may be added to a message directed to the MS or preset in the system. The action time is set to an appropriate value considering the time until the BS receives a response message from the MS after the MS receives a forward common channel message from the BS. including reservation action time (CE_Reserve. Request with Action Time) to the PHY of the BS. The action time is added by the BS LAC layer or signaling layer. The duration (T_designated) of the CE reserved state is also set to prevent continuous occupation of the channel element and misuse of resources in case the BS fails to receive the response message within a predetermined time. The reservation duration can be set considering the time required for transmission of the forward common channel message, the time required to process the forward common channel message in the MS, and the time taken for other related operations.

In step 803, the PHY notifies the RC of information about CE reservation. If it is not possible to reserve the channel element, the PHY generates a signal indicating "reservation unavailable" and the timer value is not set. If the channel element has been reserved, the PHY generates a reservation complete signal. In step 804, the RC transmits a response received from the PHY to the L3.

If the L3 receives a signal indicating "reservation unavailable", it transmits common channel designation request information to the L2 through a message control status block (MCSB) to receive a response message for a transmission message or user traffic data from the MS. Upon receipt of the MCSB with an L3 SDU from the L3, it recognizes the processing method of the current received message and adds the following fields to a message for designation of a common channel.

The L2 sets DESIGNATED_MODE to 1 and writes the address of a common power control channel for reference in the MS and the data rate of a designated channel in the fields DAM_ADDRESS and RATE_WORD, respectively. If the L2 adds the action time to the message, it sets USE_TIME and ACTION_TIME. The action time can be added by the L3.

If there is no common channel designation indication in the MCSB, the L2 sets DESIGNATED_MODE to 0 and omits the fields DAM_ADDRESS and RATE_WORD. Either the L2 or the L3 does not add USE_TIME and ACTION_TIME. This implies that the reverse common channel has the same characteristics as a conventional reverse common channel.

The thus-constituted message is transmitted to the MS on a forward common channel in step 805. Setting DESIGNATED_MODE to 1 in the transmission message implies that the MS should spread the reverse common channel with a particular long code. The long code may be a code unique to the MS.

FIG. 8B illustrates a BS operation similar to that shown in FIG. 8A, except that the L2 reserves the CE. Referring to FIG. 8B, the L3 transmits an MCSB including a command requesting setting of ACK_REQ along with an SDU to the L2 in step 810. If the received MCSB includes the command requesting seeting of ACK_REQ, the L2 transmits Designated_Mode.Request to the RC, commanding reservation of the CE in step 811. In step 812, the RC checks the MAC state of the MS and transmits CE_Reserve.Request to the PHY. If the BS knows the ESN of the MS (e.g., in a suspended state), it designates an ESN-based long code mask. Otherwise, it designates a schedule R-CCCH long code mask. In addition, the BS sets an action time for synchronization to a message transmission time of the MS. The action time can be set using the previous action time value transmitted through a common channel designation request message or an (enhanced) access parameter message. In step 813, the PHY notifies the RC of information about CE reservation. In step 814, the RC transmits information about whether common channel designation is successful or not to the L2. In the case of successful common channel designation, the RC informs the LS of a designated long code mask type. The L2 sets common channel designated-related fields and adds them to a transmission message in step 806 and transmits the message on an F-CCCH I step 807.

If the L3 receives a signal indicating "reservation unavailable", it transmits common channel designation request information to the L2 through a message control status block (MCSB) to receive a response message for a transmission message or user traffic data from the MS. Upon receipt of the MCSB with an L3 SDU from the L3, the L2 recognizes the processing method of the current received message and adds the following fields to a message for designation of a common channel.

The L2 sets DESIGNATED_MODE to 1 and writes the address of a common power control channel for reference in the MS and the data rate of a designated channel in the fields DAM_ADDRESS and RATE_WORD, respectively. If the L2 adds the action time to the message, it sets USE_TIME and ACTION_TIME. The action can be added by the L3.

If there is no common channel designation indication in the MCSB, the L2 sets DESIGNATED_MODE to 0 and omits the fields DAM_ADDRESS and RATE_WORD. Either the L2 or the L3 does not add USE_TIME and ACTION_TIME. This implies that the reverse common channel has the same characteristics as a conventional reverse common channel.

The thus-constituted message is transmitted to the MS on a forward common channel in step 805. Setting DESIGNATED_MODE to 1 in the transmission message implies that the MS should spread the reverse common channel with a particular long code. The long code may be a code unique to the MS.

FIG. 9A illustrates a BS operation when the BS receives the response message for the transmitted forward common channel message or user data traffic from the MS on the designated reverse common channel according to a second embodiment of the present invention.

Referring to FIG. 9A, the BS receives the response message from the MS on the designated reverse common channel in step 901. If the reverse common channel has not been designated, the BS has, in effect, received the message on a conventional access channel.

In step 902, the L3 notifies the RC that the designated duration of the reverse common channel expires, when the L3 receives the user traffic data or the response message for the transmitted message that requires a response.

In step 903, the RC notifies the PHY that the reverse common channel should be released from the designated mode. Then, the PHY demodulates the designated reverse common channel spread with a unique MS long code, (e.g., an ESN) and releases the reservation of the channel element.

In step 904, the PHY notifies the RC that the reservation of the channel element has been released. Then, the RC notifies the L3 of the release of the channel element from the reserved state, thereby wholly releasing the reverse common channel from the designated mode, in step 905.

FIG. 9B illustrates a procedure of releasing the reverse common channel from a designated mode in the BS LAC layer, unlike the procedure shown in FIG. 9A. In step 910, a message is received on a designated R-CCCH. The L2 processes ACK_REQ of the received message, determines whether the message is a response for a message requiring DAM, and transmits a DAM release request to the RC if the message is the response message in step 911. The RC requests release of the CE in step 912. The PHY releases the CE from the reserved state and notifies the RC of the result in step 913. The RC notifies the L2 that DAM has been released in step 914.

FIG. 10 illustrates a procedure of processing a message including reverse common channel designation request information from the BS and transmitting a response message for the received message to the BS in the MS.

Referring to FIG. 10, the MS receives a message from the BS on the forward common channel in step 1001.

The L2 of the MS recognizes that the received message has a reverse common channel designation request field and places a designated mode indicator requesting transmission of the response message on the designated reverse common channel in a PCSB (PDU Control Status Block) along with an L3 SDU free of the LAC layer-related fields of the received message to the L3 in step 1002. The L3 transmits the L3 SDU and the MCSB including information requesting transmission of the response message on the designated reverse common channel to the L2 in step 1003.

The L2 recognizes that the current received message is to be transmitted on the designated reverse common channel from an analysis of the MCSB received with the L3 SDU, does not add MS ID-related fields as shown in Table 3, and transmits an L2 PDU and PCSB to the MAC layer of the MS in step 1004. Here, the MS ID-related fields are excluded in the L2 PDU and a designated mode indicator is placed in the PCSB. The MAC layer transmits a signal requesting the current transmission message to be spread with a unique long code to the PHY in step 1005.

The PHY spreads the reverse common channel using an ESN mask, a private long code mask, or a designated long code mask and transmits a response message or user traffic data on the designated reverse common channel in step 1006. Here, the MS refers to a common power control channel in transmitting the message to the BS. The ID of the common power control channel can be detected from DAM_ADDRESS and the transmission rate of the reverse common channel is set according to RATE_WORD in the message received from the BS. If the message received from the BS designates an action time, the MS transmits the response message or the user traffic data to the BS at the designated action time. On the other hand, if the system sets the action time of the CE to a particular value, the MS does not know the action time and thus transmits the message at an arbitrary time.

Therefore, a reverse common channel signal is spread with an MS unique long code or a particular spreading code designated by the BS prior to transmission. Consequently, the designated reverse common channel serves similarly as a dedicated channel.

Designation of a common channel in the MS and BS will now be described according to a third embodiment of the present invention.

FIG. 11 illustrates a BS transmission procedure for designation of a common channel according to a third preferred embodiment of the present invention.

The L3 generates an L3 SDU and transmits the L3 SDU and an MCSB indicating that the generated message can request designation of a common channel to the L2 in step 1100. The L2 determines whether the received L3 SDU request designation of a common channel by processing the MCSB, generates an L2 PDU by adding L2-generated fields to the L3 SDU, and transmits the L2 SDU and a PCSB indicating that the message requests common channel designation to the MAC layer in step 1101. Here, the L2 sets the field ACK_REQ of the message to 1 to indicate this message requires a response from the MS.

If the MAC layer finds out that the current message is a common channel designation request message by interpreting the PCSB, it transmits Designated_mode.Request command to the RC to reserve a CE of the PHY in step 1102. The RC transmits CE_Reserve.Request with action time to the PHY in step 1103. The action time can be promised between the BS and the MS or set by the BS and then notified of to the MS through a message. A long code mask type is also transmitted to the MS for use in common channel designation. The PHY transmits information about the reserved state of the CE to the RC in step 1104.

The RC notifies the MAC layer whether the CE of the PHY has been successfully reserved and of a long code mask to be used during common channel designation in the MS in step 1105. After the MAC layer confirms that the CE has been successfully reserved, it constructs fields (i.e., DESIGNATED_MODE, DAM_ADDRESS, and RATE_WORD) necessary for common channel designation, and adds them to the L2 PDU in step 1106. In step 1107, the BS transmits the message including the common channel designation information to the MS on the F-CCCH.

FIG. 12 illustrates a BS reception procedure for common channel designation, according to a third embodiment of the present invention.

Referring to FIG. 12, the BS receives a response message for its transmitted message on a designated R-CCCH in step 1201. The MAC layer confirms that the current received message has been received on the designated common channel, constructs an L2 PDU and a PCSB, and transmits them to the L2 in step 1202. Also in step 1202, the MAC layer transmits Designated_Mode_Release.Request to the RC, requesting release of the common channel from a designated mode. The RC transmits CE_Release.Request to the PHY, requesting release of the CE from the reserved state, thereby releasing all the resources designated for designation of the common channel, in step 1205.

FIG. 13 illustrates a reverse common channel processing procedure for common channel designation in the MS, according to a third embodiment of the present invention.

The MAC layer of the MS receives a message from the BS and determines whether the received message is a common channel designation request message in step 1300.

After the MAC layer confirms that the received message is a common channel designation request message, it requests the PHY that it is changed to a long code mask to be used for common channel designation in step 1301. Also, the MAC layer transmits an L2 PDU and a PCSB including common channel designation request information to the L2. The L2 analyses the PCSB and transmits an L3 SDU and an MCSB with common channel designation indicating information to the L3 in step 1302. The L3 transmits the L3 SDU and the MCSB to the L2 in step 1303. The L2 transmits the L2 PDU and the PCSB to the MAC layer in step 1304.

The MAC layer constructs a message converted from the L2 PDU and transmits the message to the PHY in step 1305. The PHY spreads the received message using the designated long code mask and transmits the spread message on the R-CCCH in steps 1306. Here, the MS starts the message transmission at an action time promised with the BS and controls the transmission power of the message using a common power control channel designated by the BS.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method of designating a reverse common channel to be dedicated in a base station of a CDMA communication system, comprising the steps of:
   designating a reverse common channel on which to receive a response message to be dedicated when a message requiring the response message is generated;
   generating designated channel indicating parameters including a reverse common channel designation indicator and an action time;
   transmitting the generated message together with the designated channel indicating parameters to a mobile station; and
   receiving the response message from the mobile station on the designated reverse common channel at the action time.

2. The method of claim 1, wherein the designated channel indicating parameters further include the address of a common power control channel for use in controlling the transmission power of the reverse common channel and the data rate of the reverse common channel.

3. The method of claim 2, wherein the mobile station uses an ESN (Electronic Serial Number) mask of the mobile station to generate a spreading code for channel designation.

4. The method of claim 1, wherein the generated message is transmitted on a forward common channel and is one of the following messages requiring response messages: Status Request Message, TMSI Assignment Message, General Page Message, SSD Update Message, Authentication Challenge Message, Base Station Challenge Confirmation Order, Extended Release Message, Service Redirection Message, Data Burst Message, Service Release Message, and Order Message.

5. A method of releasing a reverse common channel from a designated mode in a base station of a CDMA communication system, comprising the steps of:
   reserving a predetermined reverse common channel as a designated channel;

setting a reservation time when a message is generated that requires a response message on the reverse common channel;

generating designated channel indicating parameters including a reverse common channel designation indicator and an action time;

transmitting the generated message together with the designated channel indicating parameters to a mobile station;

checking whether the response message has been received on the designated reverse common channel within the reservation time; and releasing the reverse common channel from the designated mode if the response message has been received within the reservation time or the response message has not been received until the reservation time expires.

6. The method of claim 5, wherein the designated channel indicating parameters further include the address of a common power control channel for use in controlling the transmission power of the reverse common channel and the data rate of the reverse common channel.

7. The method of claim 6, wherein the mobile station uses an ESN (Electronic Serial Number) mask of the mobile station to generate a spreading code for channel designation.

8. A method of designating a reverse common channel to be dedicated in a mobile station of a CDMA communication system, comprising the steps of:

receiving a message on a forward common channel;

analyzing the received forward common channel message;

setting the reverse common channel to a designated mode if the received message has designated channel indicating parameters that includes a reverse common channel designation indicator and an action time for designation;

generating a response message for the received message;

designating the reverse common channel to be dedicated by assigning a designated channel spreading code to the reverse common channel; and transmitting the response message on the designated reverse common channel at the action time.

9. The method of claim 8, wherein the designated channel indicating parameters further include an address of a common power control channel for use in controlling transmission power of the reverse common channel and data rate of the reverse common channel, a transmission rate of the response message is controlled based on the common power control channel, and the response message is transmitted on the set data rate.

10. The method of claim 9, wherein the spreading code is generated using an ESN (Electronic Serial Number) mask of the mobile station.

11. A method of designating a channel to be dedicated between a base station and a mobile station in a CDMA communication system, comprising the steps of:

generating designated channel indicating parameters including a common channel designation indicator, an address of a common power control channel, transmission rate, and action time;

transmitting a message together with the designated channel indicating parameters to a mobile station by a base station; and receiving the message with the designated channel indicating parameters and transmitting a response message for the received message to the base station on a designated channel indicated by the designated channel indicator with transmission power set by the common power control channel at the transmission rate at the action time by the mobile station.

12. An apparatus for designating a reverse common channel in a base station of a CDMA communication system, comprising:

a message generator for generating designated channel indicating parameters including a reverse common channel designation indicator and action time for designation and for generating a forward common channel message with the designated channel indicating parameters;

a forward common channel transmitter for transmitting the forward common channel message to a mobile station; and a reverse common channel to be reserved when the forward common channel message is transmitted and for receiving a response message for the forward common channel message on a reverse common channel that is designated to be dedicated for a reservation time through spreading with a designated channel spreading code.

13. An apparatus for designating a reverse common channel in a mobile station of a CDMA communication system, comprising:

a forward common channel receiver for receiving a message on a forward common channel;

a message analyzer for analyzing the received forward common channel message, for setting the reverse common channel to a designated mode if the received message has designated channel indicating parameters that includes a reverse common channel designation indicator and an action time for designation, and for generating a response message for the received message; and a reverse common channel transmitter for designating the reverse common channel to be dedicated in the designated mode and for transmitting the response message on the designated reverse common channel at the action time.

14. A method of designating a reverse common channel in a base station, comprising the steps of:

reserving an available reverse common channel to be assigned to a physical channel of the base station in response to a designated mode request from a signaling layer of the base station;

constructing, by the signaling layer, a message by including designated channel indicating parameters in transmission data, said designated channel indicating parameters being a designated channel indicator and an action time of designation; and transmitting the constructed message on a forward common channel through the physical layer.

15. A method of designating a reverse common channel in a mobile station, comprising the steps of:

transmitting, by a physical layer of the mobile station, a message including dedicated channel indicating parameters to a signaling layer of the mobile station, said message being received on a forward common channel, said dedicated channel indicating parameters being a designated channel indicator and action time of designation;

generating, by the signaling layer, a response message, said response message having designation indicating information;

requesting, by the signaling layer, the physical layer to designate a spreading code for common channel designation and an action time by the signaling layer;

spreading, by the physical layer, the response message with the designated spreading code at the designated action time; and transmitting, by the physical layer, the response message on a designated reverse common channel.

16. A method of designating a reverse common channel in a base station, comprising the steps of:

reserving an available reverse common channel to be assigned to a physical channel of the base station in response to a designated mode request from a signaling layer of the base station;

providing, by the signaling layer, transmission data and designated channel indicating parameters, said designated channel indicating parameters including a designated channel indicator and an action time of designation;

constructing, by a link access control layer of the base station, a message out of the transmission data and the designated channel indicating parameters; and transmitting the constructed message on a forward common channel through the physical layer.

17. A method of designating a reverse common channel in a mobile station, comprising the steps of:

transmitting, by a physical layer of the mobile station, a message including dedicated channel indicating parameters to a link access control layer of the mobile station, said message being received on a forward common channel, said dedicated channel indicating parameters including a designated channel indicator and an action time of designation;

adding, by the link access control layer, designation indicating information to the received message;

transmitting, by the link access control layer, the received message with the added designation indicating information to a signaling layer of the mobile station;

generating, by the signaling layer, a response message;

adding, by the signaling layer, designation indicating information to the response message;

transmitting, by the signaling layer, the resulting response message to the link access control layer;

requesting, by the link access control layer, the physical layer to designate a spreading code for common channel designation and an action time;

spreading, by the physical layer, the response message with the designated spreading code at the designated action time; and transmitting, by the physical layer, the spread response message on a designated reverse common channel.

18. A method of designating a reverse common channel in a base station, comprising the steps of:

reserving an available reverse common channel to be designated in a physical channel of the base station in response to a designated mode request from a signaling layer of the base station;

providing, by the signaling layer, transmission data and designated channel indicating parameters, said designated channel indicating parameters including a designated channel indicator and an action time of designation;

constructing, by a Medium Access Control (MAC) layer of the base station, a message out of the transmission data and the designated channel indicating parameters; and transmitting the constructed message on a forward common channel by the physical layer.

19. A method of designating a reverse common channel in a mobile station, comprising the steps of:

transmitting, by a physical layer of the mobile station, a message including dedicated channel indicating parameters to a Medium Access Control (MAC) layer of the mobile station, said message being received on a forward common channel, said dedicated channel indicating parameters including a designated channel indicator and an action time of designation;

adding, by the MAC layer, designation indicating information to the received message;

transmitting, by the MAC layer, the received message with the added designation indicating information to a signaling layer of the mobile station;

generating, by the signaling layer, a response message;

adding, by the signaling layer, designation indicating information to the response message;

transmitting, by the signaling layer, the resulting response message to the MAC layer;

requesting, by the MAC layer, the physical layer to designate a spreading code for common channel designation and an action time;

spreading, by the physical layer, the response message with the designated spreading code at the designated action time; and transmitting, by the physical layer, the spread response message on a designated reverse common channel.

20. An apparatus for designating a reverse common channel in a base station of a CDMA communication system, comprising:

a message generator for generating designated channel indicating parameters including a reverse common channel designation indicator and action time for designation and for generating a forward common channel message with the designated channel indicating parameters;

a forward common channel transmitter for transmitting the forward common channel message to a mobile station; and a reverse common channel receiver for receiving a response message transmitted by the mobile station via a designated reserved common channel for a reservation time.

* * * * *